United States Patent
Oslizlo et al.

(10) Patent No.: US 9,180,839 B2
(45) Date of Patent: Nov. 10, 2015

(54) WINDSCREEN WIPER DEVICE

(71) Applicant: Federal-Mogul Corporation, Southfield, MI (US)

(72) Inventors: Michael Oslizlo, Milan, MI (US); Dennis E. Cox, Belleville, MI (US)

(73) Assignee: Federal-Mogul Corporation, Southfield, MI (US)

( * ) Notice: Subject to any disclaimer, the term of this patent is extended or adjusted under 35 U.S.C. 154(b) by 216 days.

(21) Appl. No.: 13/728,280

(22) Filed: Dec. 27, 2012

(65) Prior Publication Data

US 2013/0167317 A1  Jul. 4, 2013

Related U.S. Application Data

(60) Provisional application No. 61/581,474, filed on Dec. 29, 2011.

(51) Int. Cl.
*B60S 1/40* (2006.01)
*B60S 1/38* (2006.01)

(52) U.S. Cl.
CPC ............. *B60S 1/4067* (2013.01); *B60S 1/387* (2013.01); *B60S 1/4016* (2013.01); *B60S 1/4019* (2013.01); *B60S 2001/4022* (2013.01); *B60S 2001/4054* (2013.01)

(58) Field of Classification Search
CPC .... B60S 1/3849; B60S 1/4006; B60S 1/4016; B60S 2001/4022; B60S 2001/4035; B60S 1/4009; B60S 2001/4012; B60S 1/387; B60S 1/4067; B60S 2001/4054; B60S 1/4019
USPC ............. 15/250.32, 250.351, 250.31, 250.43, 15/250.44, 250.201
See application file for complete search history.

(56) References Cited

U.S. PATENT DOCUMENTS

| 6,978,511 B2 | 12/2005 | Poton |
| 7,159,268 B2 | 1/2007 | Poton |
| 7,395,578 B2 | 7/2008 | Huang |

(Continued)

FOREIGN PATENT DOCUMENTS

| DE | 102008030250 A1 | 1/2009 |
| DE | 212007000044 U1 | 2/2009 |

(Continued)

OTHER PUBLICATIONS

International Search Report mailed Mar. 25, 2013 (PCT/US2012/071761).

*Primary Examiner* — Gary Graham
(74) *Attorney, Agent, or Firm* — Robert L. Stearns; Dickinson Wright, PLLC

(57) ABSTRACT

A windscreen wiper device, or a wiper blade assembly, for cleaning a windshield of a vehicle is provided. The wiper blade assembly includes a wiper strip that extends in a longitudinal direction and at least one carrier element in engagement with the wiper strip for supporting and biasing the wiper strip into a predetermined configuration. An at least two piece connecting device is coupled to the at least one carrier element. One piece of the connecting device is a main piece that has a bearing surface shaped, and the other piece is a door piece that is pivotable between an open position for allowing attachment and detachment between the connecting device and the wiper arm and a closed position for securing the wiper arm into engagement with the wiper blade assembly. The door piece is pivotably coupled to the main piece about an axis that extends in a longitudinal direction.

11 Claims, 7 Drawing Sheets

(56) References Cited

U.S. PATENT DOCUMENTS

| | | |
|---|---|---|
| 7,523,522 B2 | 4/2009 | Herring et al. |
| 7,587,782 B2 * | 9/2009 | Inoue .................. 15/250.32 |
| 7,716,780 B2 | 5/2010 | Scholl et al. |
| 7,823,247 B2 | 11/2010 | Poton |
| 7,827,652 B2 | 11/2010 | Yang et al. |
| 7,891,044 B2 | 2/2011 | Fink et al. |
| 7,908,703 B2 | 3/2011 | Van Bealen |
| 7,937,798 B2 | 5/2011 | Fink et al. |
| 2006/0130263 A1 | 6/2006 | Coughlin |
| 2008/0115308 A1 | 5/2008 | Lee |
| 2008/0134455 A1 | 6/2008 | Kinnaert et al. |
| 2008/0289133 A1 | 11/2008 | Kim |
| 2009/0307862 A1 | 12/2009 | Boland |
| 2009/0313782 A1 | 12/2009 | Chien |
| 2010/0000041 A1 | 1/2010 | Boland |
| 2010/0005609 A1 | 1/2010 | Kim |
| 2010/0024149 A1 * | 2/2010 | Erdal .................. 15/250.32 |
| 2010/0050361 A1 | 3/2010 | Chang et al. |
| 2010/0186185 A1 | 7/2010 | Grasso et al. |
| 2010/0205763 A1 | 8/2010 | Ku |
| 2010/0293737 A1 | 11/2010 | Ollier |
| 2011/0047742 A1 | 3/2011 | Kim et al. |
| 2011/0056042 A1 | 3/2011 | Fink et al. |
| 2011/0072607 A1 | 3/2011 | Van Baelen et al. |
| 2011/0107542 A1 | 5/2011 | Op't Roodt |
| 2011/0113583 A1 | 5/2011 | Shanmugham et al. |
| 2011/0247166 A1 | 10/2011 | DePondt et al. |
| 2011/0258802 A1 | 10/2011 | Op't Roodt et al. |
| 2011/0265280 A1 | 11/2011 | Westermann et al. |
| 2011/0277264 A1 | 11/2011 | Ehde |
| 2011/0277265 A1 | 11/2011 | Ehde |

FOREIGN PATENT DOCUMENTS

| | | | |
|---|---|---|---|
| DE | 102009000762 A1 | | 8/2010 |
| EP | 2142404 B1 | * | 10/2011 |
| FR | 2830823 A1 | | 4/2003 |
| GB | 2361414 A | * | 10/2001 |
| WO | 2011144244 A1 | | 11/2011 |

* cited by examiner

WINDSCREEN WIPER DEVICE

CROSS REFERENCE TO RELATED APPLICATION

This application claims the benefit of application Ser. No. 61/581,474, filed Dec. 29, 2011, the entire contents of which is hereby incorporated by reference.

BACKGROUND OF THE INVENTION

1. Field of the Invention

The present invention is related to windscreen wiper devices, or wiper blades, and more precisely to connector assemblies for attaching aftermarket wiper blades to different types of wiper arms.

2. Related Art

Some customers have difficulty connecting new wiper blades to the hook shaped ends of hook style wiper arms. If the wiper blade is not properly secured with the wiper arm, it may become detached therefrom while the vehicle is travelling at speed and become a potentially dangerous projectile. Some wiper blade manufacturers have produced wiper blade assemblies with a connecting device that incorporates a door feature to lock the wiper blade assembly into engagement with a hook style wiper arm. However, these wiper blade assemblies may be costly to produce and/or difficult or cumbersome to for some customers use.

SUMMARY OF THE INVENTION

One aspect of the present invention provides for a windscreen wiper device, or a wiper blade assembly, for cleaning a windshield of a vehicle. The windscreen wiper device includes a wiper strip that extends in a longitudinal direction and at least one carrier element in engagement with the wiper strip for operatively supporting and biasing the wiper strip into a predetermined configuration. An at least two piece connecting device is operatively coupled to the at least one carrier element. One of the pieces is a main piece having a bearing surface shaped for receiving and operatively supporting the end of a hook-style wiper arm, and the other piece is a door piece that is pivotably coupled to the main piece. The door piece is pivotably coupled to the main piece about an axis that extends in the longitudinal direction. This configuration is advantageous because it allows a very secure connection to be established very quickly and easily between the wiper blade assembly and a hook style wiper arm. Specifically, the door piece may be pivoted about the longitudinal axis to be far out of the way of the front of the main piece when the main piece is inserted into the end of the hook style wiper arm. The door piece may then be closed and pushed in a downward direction to latch into the closed position.

According to another aspect of the present invention, one of the main and door pieces includes a pin that extends along the longitudinal axis and the other includes a generally claw shaped receiver engaging at least partially around the pin to establish the pivoting connection between the door and main pieces. Thus, the pivoting relationship may be quickly established between the door and main pieces by simply snapping the claw shaped receiver in engagement with the cylindrically shaped pin.

According to yet another aspect of the present invention, the piece with the cylindrically shaped pin also includes an enlarged piece disposed at the end of the cylindrically shaped pin to restrict detachment of the claw shaped receiver from the pin.

According to still aspect of the present invention, the door piece includes a tongue that is integrally formed with the remainder of the door piece and is positioned to trap a portion of the end of the hook style wiper arm between itself and the bearing surface of the main piece to rigidly secure the hook style wiper arm with the wiper blade assembly. This improves the connection between the wiper arm and the wiper blade assembly.

According to even another aspect of the present invention, the door piece includes a support member that extends between the tongue and another portion of the door piece to reinforce the tongue. This allows the tongue to be formed of a thinner, weaker material without compromising its ability to resist forces between the connecting device and the hook style wiper arm.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
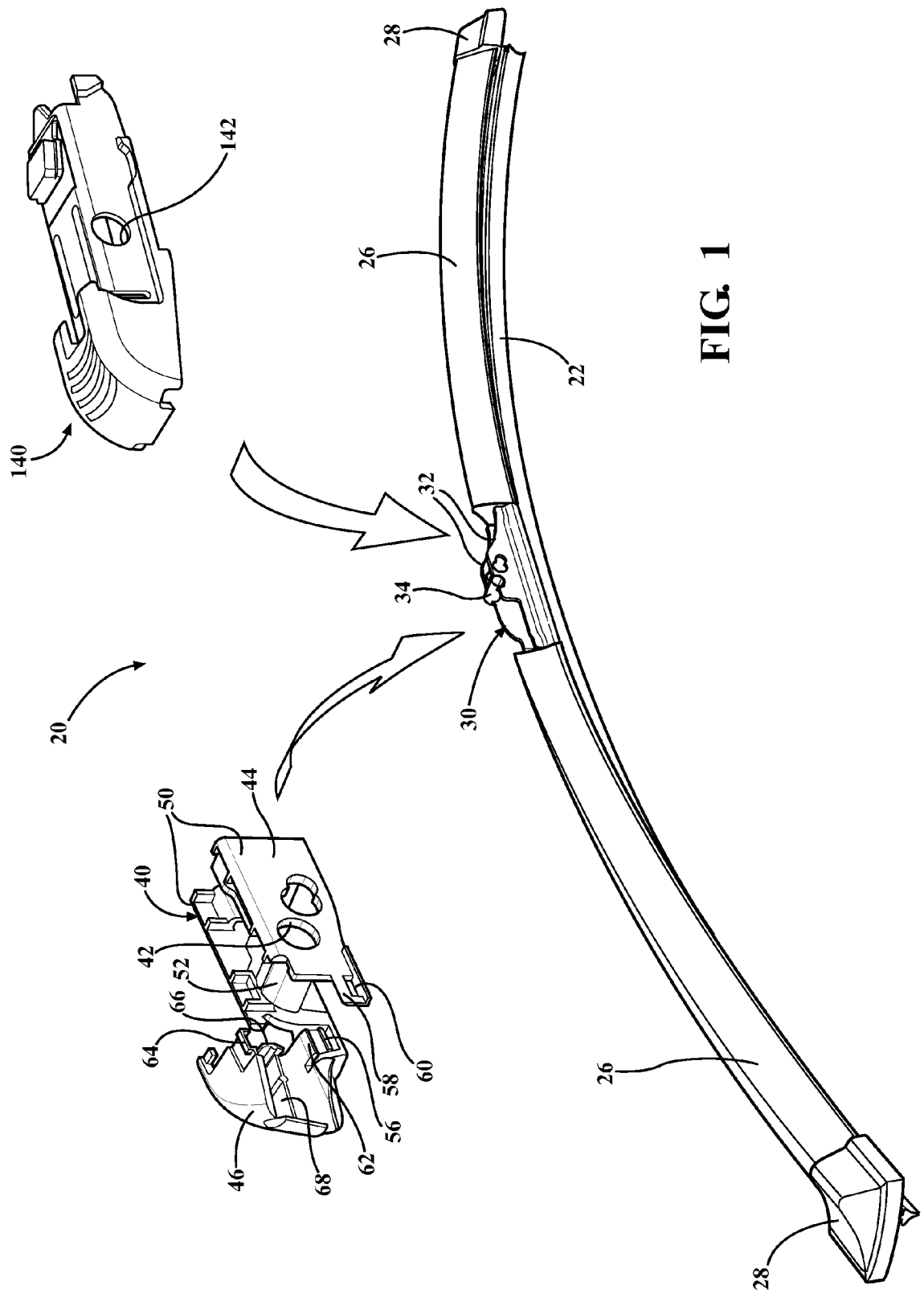
FIG. 1 is a perspective and partially exploded view of an exemplary wiper blade assembly including two connecting devices.
Figure 2:
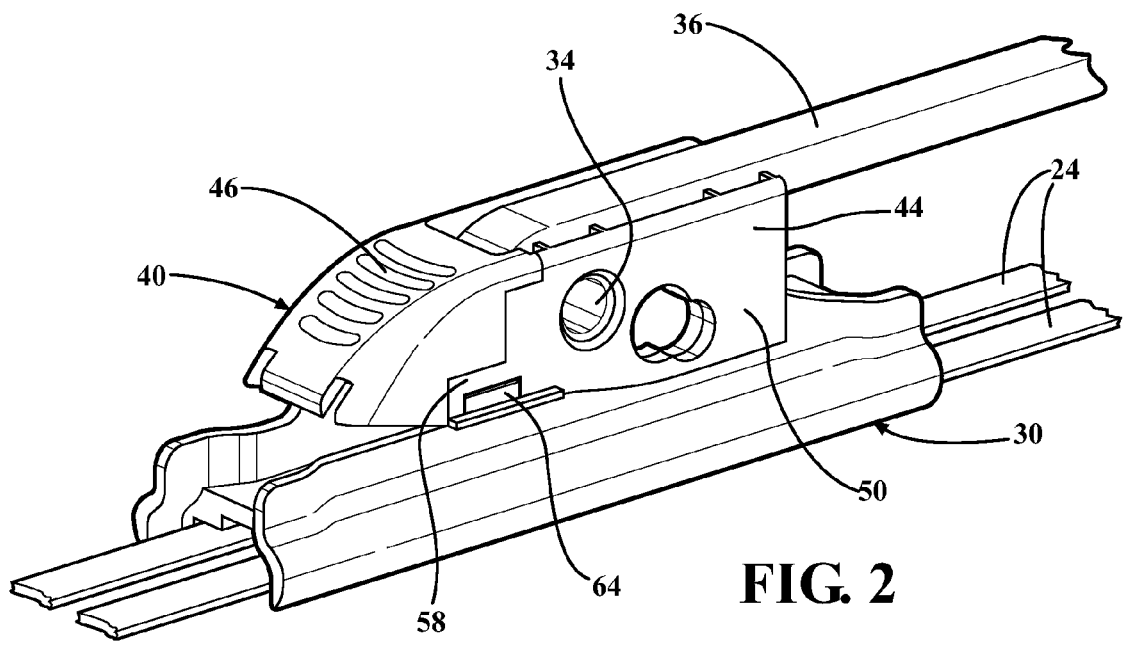
FIG. 2 is a perspective and elevation view of a first of the connecting devices in engagement with a base and a hook style wiper arm.

Referring to the Figures, wherein like numerals indicate corresponding parts throughout the several views, a windscreen wiper device, or a wiper blade assembly 20, is generally shown in FIG. 1. The wiper blade assembly 20 includes a longitudinally extending wiper strip 22 of a flexible material, such as rubber, for sealing against a vehicle's windshield (not shown) and for driving rain, snow, ice or other elements away therefrom. The exemplary wiper strip 22 includes a pair of oppositely facing grooves that extend the entire length of the wiper strip 22. Carrier elements 24 (shown in FIG. 2 and also known as flexors) are disposed in the grooves and in engagement with the wiper strip 22 to bias the wiper strip 22 into a predetermined configuration. More precisely, the exemplary carrier elements 24 extend beyond the longitudinal ends of the wiper strip 22 and are self-biased into a pre-curved shape to bias the wiper strip 22 into a pre-curved configuration which allows the entire length of the wiper strip 22 to be sealed against a curved windshield (not shown) of a vehicle. A pair of spoiler elements 26 are engaged with the carrier elements 24 and extend lengthwise to create a down force when the vehicle is travelling at speed to improve the seal between the wiper strip 22 and the windshield. End caps 28 are secured to opposite ends of the carrier elements 24 to interconnect the carrier elements 24 and to hold the spoiler elements 26 in engagement with the carrier elements 24.

In the exemplary embodiment, a base 30 is permanently secured to the carrier elements 24 approximately at their longitudinal mid-points and between the spoiler elements 26. The permanent connection between the base 30 and the carrier elements 24 may be through, for example, heat staking, crimping, welding, brazing, adhesives, fasteners, etc. The exemplary base 30 has a pair of base side walls 32 that are spaced laterally from one another and extend generally upwardly and away from the carrier elements 24. The base 30 also includes a tubular portion 34 which extends transversely between the laterally spaced base side walls 32 and laterally beyond, or past, each of the base side walls 32. The entire base 30 is preferably formed as one integral piece of a polymeric material through, for example, an injection molding process. However, the base 30 could be formed of a range of different materials and through a range of different forming processes.

Figure 13:
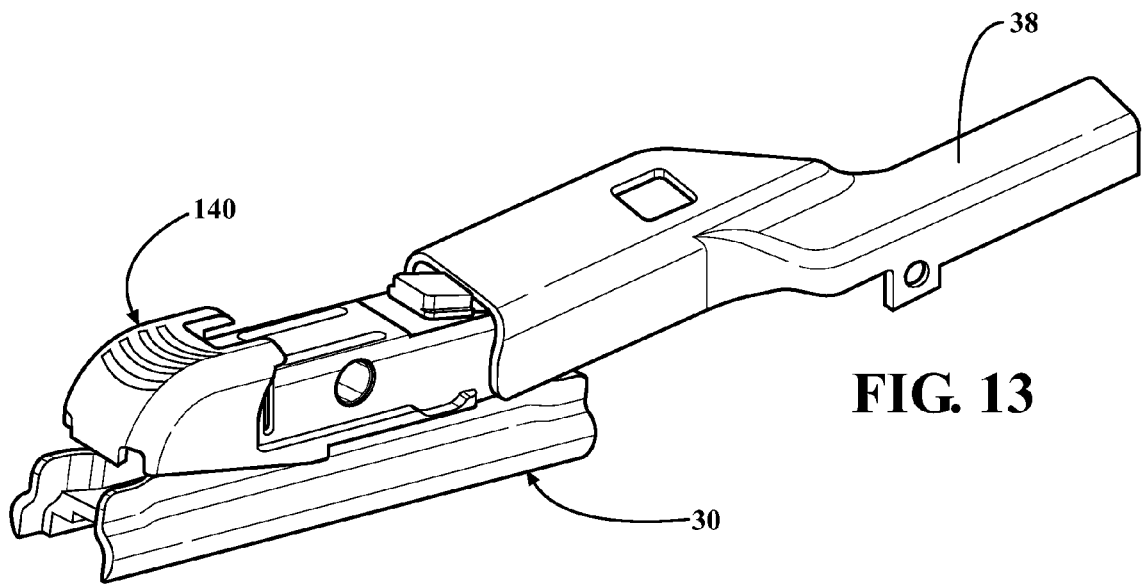
FIG. 13 is a perspective and elevation view of the second connecting device partially receiving a bayonet style wiper arm.
Figure 14:
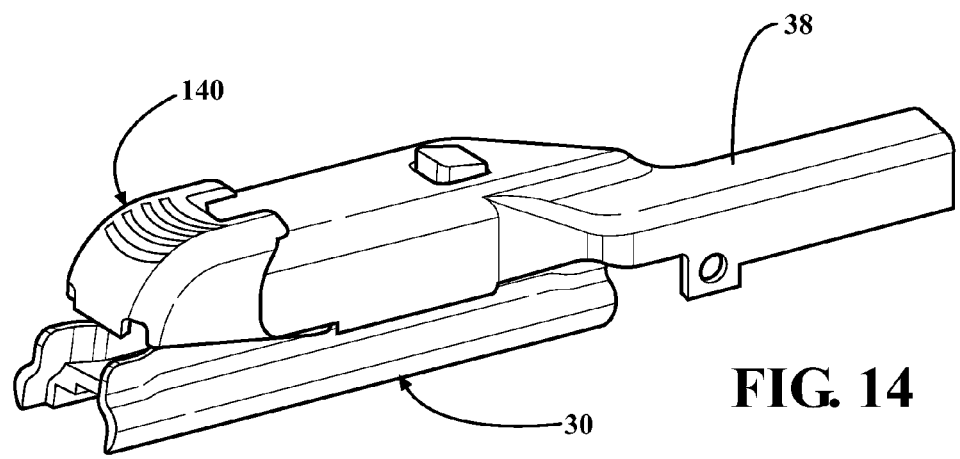
FIG. 14 is a perspective and elevation view of the second connecting device in engagement with the bayonet style wiper arm.

The exemplary wiper blade assembly 20 includes two connecting devices 40, 140 that are configured for attachment with different types or styles of oscillating wiper arms 36, 38. Specifically, a first connecting device 40 is configured for attachment to hook style wiper arms, such as the hook style wiper arm 36 shown in FIG. 2, and a second connecting device 140 is configured for attachment to bayonet or top lock-style wiper arms, such as the bayonet style wiper arm 38 shown in FIG. 13. The connecting devices 40, 140 each include apertures 42, 142 which may be snapped into engagement with the tubular portion 34 of the base 30 to quickly and easily secured or removed to/from the base 30 without any special tools or other equipment. It should be appreciated that the wiper blade assembly 20 may include any number of connecting devices for mating with any desirable types of wiper arms. A person may quickly secure whichever connecting device 40, 140 is configured for attachment to his or her vehicle's oscillating wiper arm onto the base 30, and if the person has mistakenly secured the incorrect connecting device 40, 140 to the base 30, then he or she may quickly and easily remove it and secure the correct connecting device 40, 140 in its place.

Figure 3:
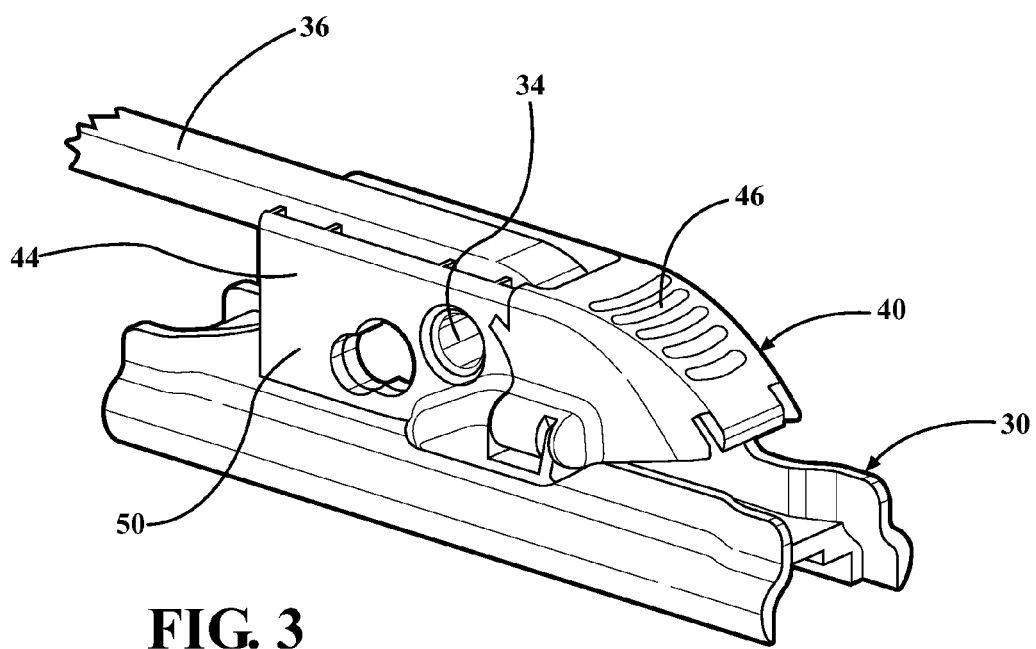
FIG. 3 a perspective and elevation view of the first connecting device in engagement with the hook-style wiper arm.
Figure 4:
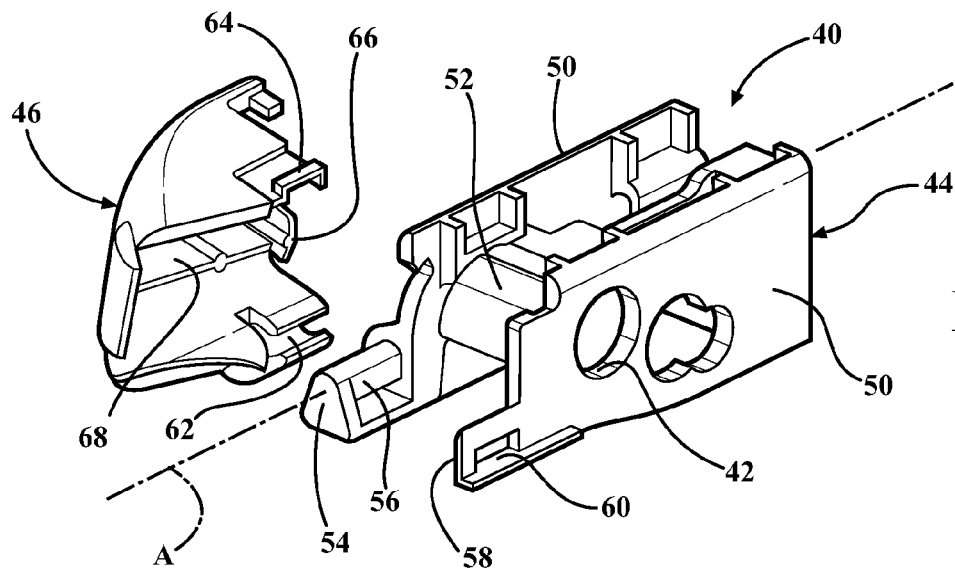
FIG. 4 is an exploded view of the first connecting device.

Referring now to FIG. 3, the first connecting device 40 is shown in engagement with a hook style wiper arm 36. As shown in FIG. 4, the first connecting device 40 includes two pieces 44, 46 which are hingedly connected to one another. One of the pieces 44, 46 is a main piece 44 and the other piece is a door piece 46. As shown, the main piece 44 has a pair of laterally spaced main piece side walls 50 and an inner bearing surface 52 that extends transversely between the main piece side walls 50. The bearing surface 52 is spaced from the tops and from the bottoms of the main piece side walls 50, and the main piece side walls 50 are spaced from one another by approximately the width of the end of the hook style wiper arm 36. As such, the main piece 44 presents a generally U-shaped channel configured to support the end of the hook style wiper arm 36, i.e. when the hook style wiper arm 36 is attached to the main piece 44, it is supported by the main piece side walls 50 and the bearing surface 52.

Referring still to FIG. 4, the main piece 44 includes a generally cylindrically shaped pin 56 which extends along a longitudinally extending axis A from the front of one of the main piece side walls 50. The cylindrically shaped pin 56 is supported on one end by the associated main piece side wall 50 and on the other end by an enlarged and generally triangularly shaped piece 54, which is also integrally connected to the main piece side wall 50. Extending forwardly of the opposite main piece side wall 50 is a tab 58 with a window 60 in it.

Figure 5:
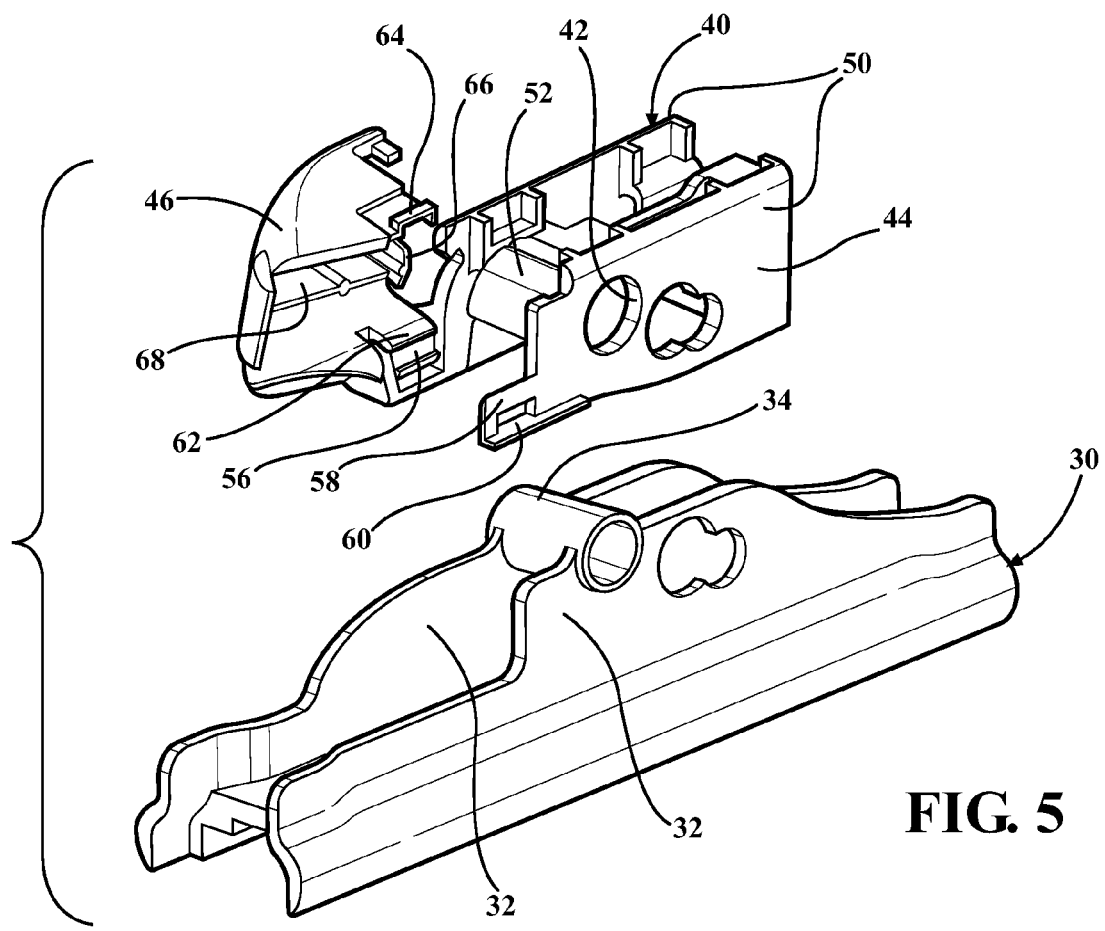
FIG. 5 is a perspective and elevation view showing the first connecting device separated from the base.

One side of the door piece 46 includes a generally claw shaped receiver 62 for snapping into engagement with the cylindrically shaped pin 56 on the main piece 44 to interconnect the door piece 46 with main piece 44. Referring now to FIG. 5, the claw shaped receiver 62 is shown in engagement with the cylindrically shaped pin 56. This connection allows the door piece 46 to pivot about the longitudinally extending axis between an open position (shown in FIG. 5) for allowing attachment and detachment between the connecting device and the hook style wiper arm 36 and a closed position (shown in FIG. 6) for securing the hook style wiper arm 36 into engagement with the windscreen wiper device. The claw shaped receiver 62 on the door piece 46 is restricted from sliding out of engagement from the cylindrically shaped pin 56 by the triangularly shaped piece 54. This is a safety feature which prevents accidental detachment of the door piece 46 from the main piece 44. On the opposite side of the claw shaped receiver 62, the door piece 46 includes a projection 64 which is shaped similarly to the window 60 of the main piece 44 for snapping into engagement with the window 60 on the tab 58 to lock the door piece 46 into the closed position shown in FIG. 6.

Referring back to FIG. 5, the door piece 46 also includes a tongue 66 which extends generally downwardly from the top of the door piece 46 and has a retaining surface for trapping the end of the hook style wiper arm 36 between the tongue 66 of the door piece 46 and the front of the bearing surface 52 of the main piece 44 when the door piece 46 is in the closed position. The door piece 46 also includes a support member 68 which extends tangentially between the front of the door piece 46 and back surface of the tongue 66 for reinforcing the tongue 66 to resist forces between the wiper blade and the hook style wiper arm 36. The entire door piece 46, including the tongue 66 and the support member 68, may thus be formed of a single, thin piece of plastic material and still be resistant to the forces between the wiper blade assembly 20 and the hook style wiper arm 36.

Figure 8:
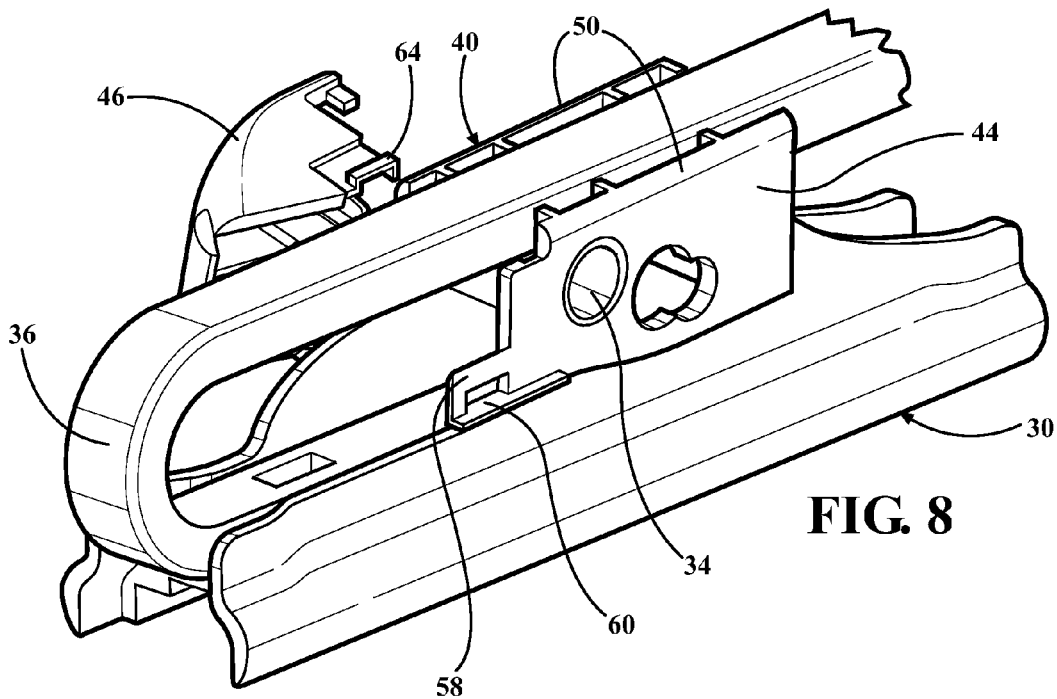
FIG. 8 is another perspective view of the first connecting device about to receive the end of the hook style wiper arm.
Figure 9:
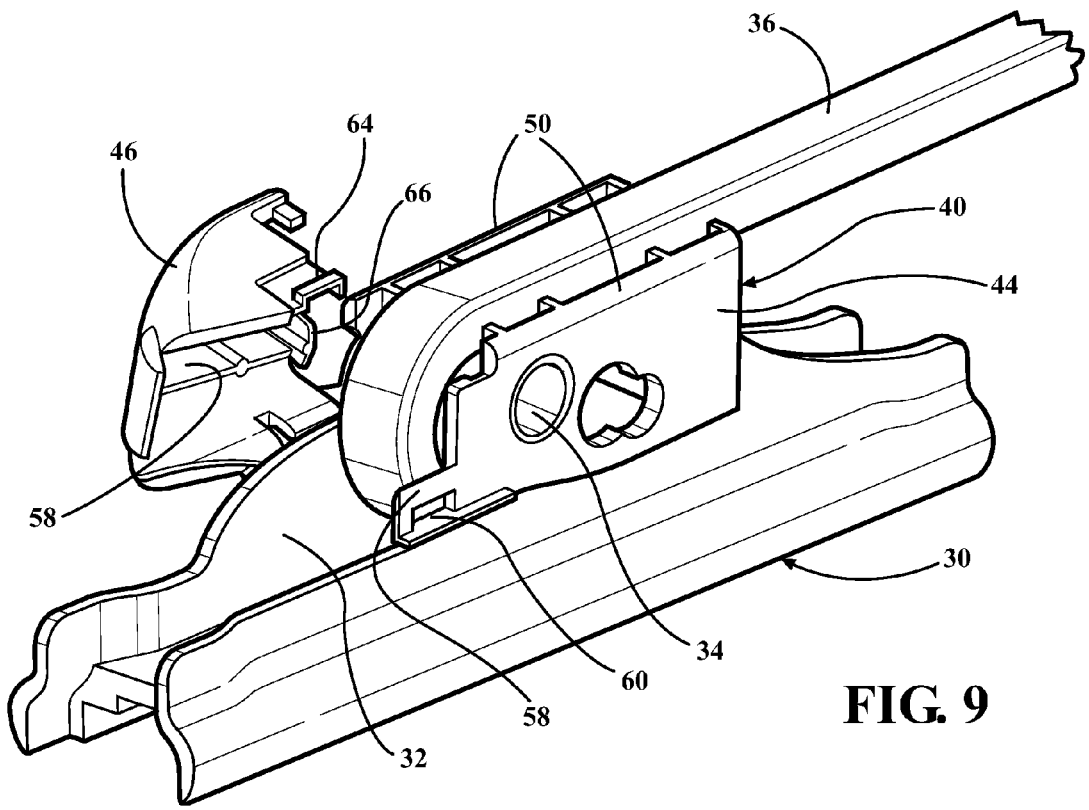
FIG. 9 is yet another perspective view of the first connecting device with the end of the hook style wiper arm being received into engagement with the end of the hook style wiper arm and with a door piece of the first connecting device being in an open position.
Figure 10:
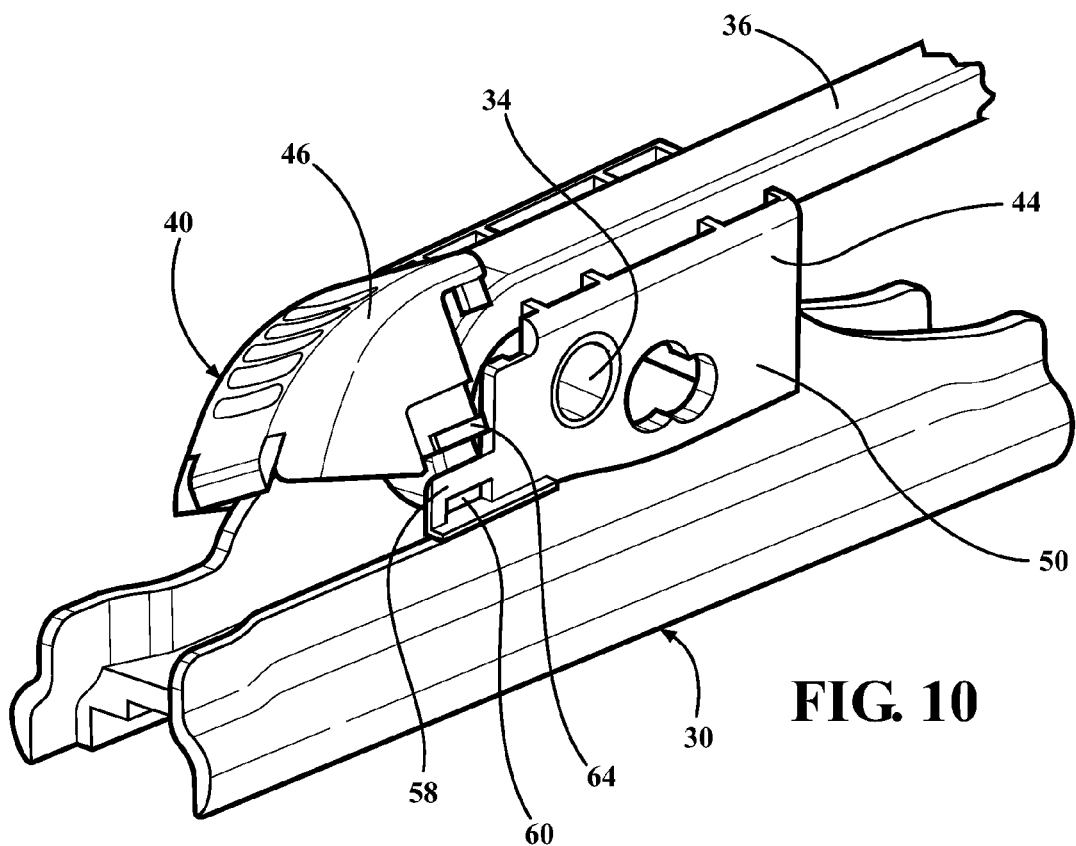
FIG. 10 is still another perspective view of the first connecting device with the end of the hook style wiper arm being received into engagement with the hook style wiper arm and with the door piece being pivoted towards a closed position.
Figure 11:
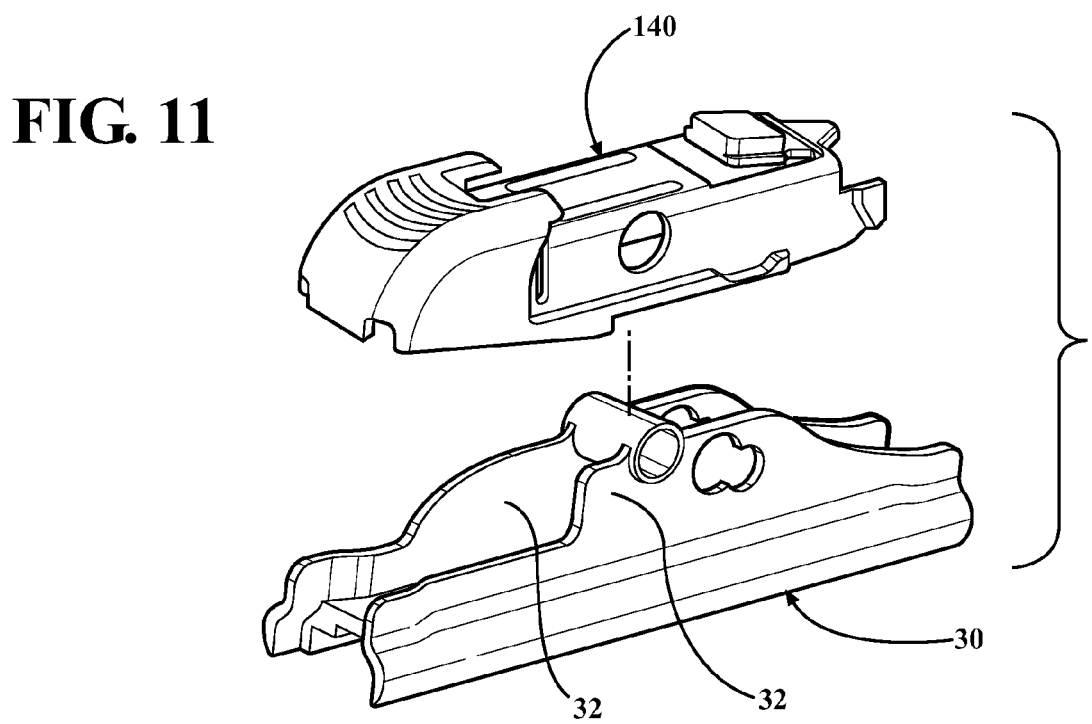
FIG. 11 is a perspective and elevation view of the second connecting device being disposed adjacent the base.
Figure 12:
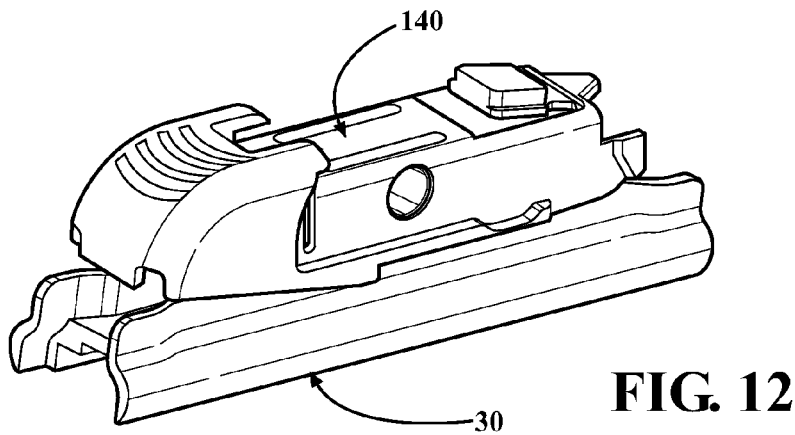
FIG. 12 is a perspective and elevation view of the second connecting device coupled to the base.

The process of coupling the hook style wiper arm 36 with the wiper blade assembly 20 first involves snapping the main piece 44 of the first connecting device 40 into engagement with the tubular portion 34 of the base 30. Next, with the door piece 46 in the open position, the first connecting device 40 is positioned relative to the end of the hook style wiper arm 36 into the position shown in FIG. 8 with the end of the hook style wiper arm 36 being disposed adjacent the front of the main piece 44. This is easily accomplished because the door piece 46 is pivoted away from the front of the main piece 44 about the longitudinally extending cylindrically shaped pin 56. As shown in FIG. 9, the first connecting device 40 is then moved forwardly to engage the end of the hook style wiper arm 36 into engagement with the bearing surface 52 of the main piece 44. Next, a user pinches the sides of the door piece 46 together and swings the door piece 46 into the closed position shown in FIG. 2. The user then releases the door, whereupon, the projection 64 on the door piece 46 snaps into engagement with the window 60 on the main piece 44 to latch the door piece 46 into the closed position. To re-open the door piece 46 to the open position, the user pinches the sides of the door piece 46 to disengage the projection 64 from the window 60, thereby allowing the door piece 46 to be pivoted back to the open position. This allows the hook style wiper arm 36 to be disengaged from the first connecting device 40. The opening and closing processes may be accomplished quickly by a user with very little effort. The door piece 46 may only be pivoted to the open position with the intentional squeezing of the sides of the door piece 46, and thus, the wiper blade assembly 20 is restricted from accidentally disengaging from the hook style wiper arm 36.

Both the main piece 44 and the door piece 46 are preferably formed of polymeric materials through injection molding processes. Accordingly, the first connecting device 40 may be fabricated very cost effectively. After these components are separately formed, the claw shaped receiver 62 of the door piece 46 may then be quickly and easily snapped into engagement with the pin of the main piece 44.

Figure 6:
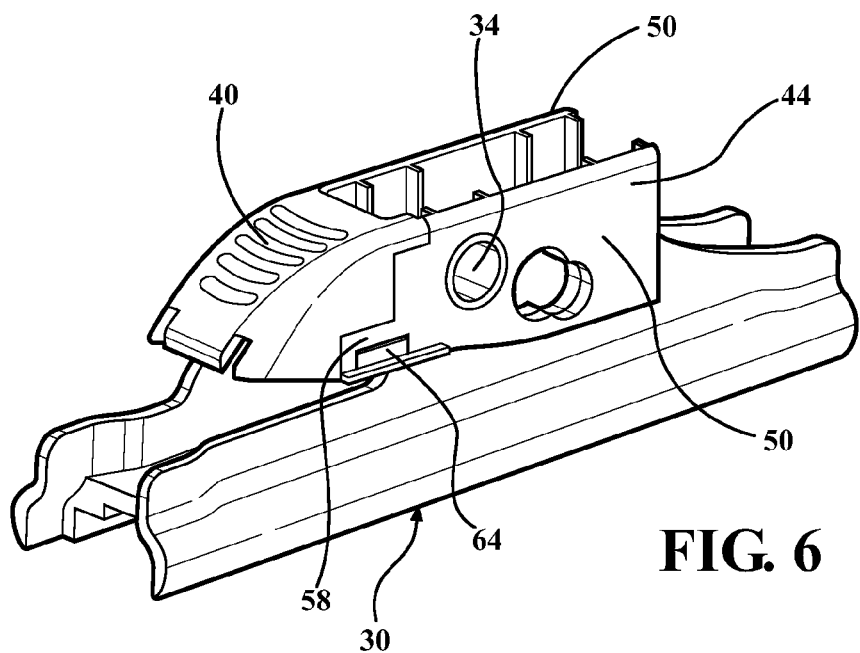
FIG. 6 is a perspective and elevation view showing the first connecting device attached to the base.
Figure 7:
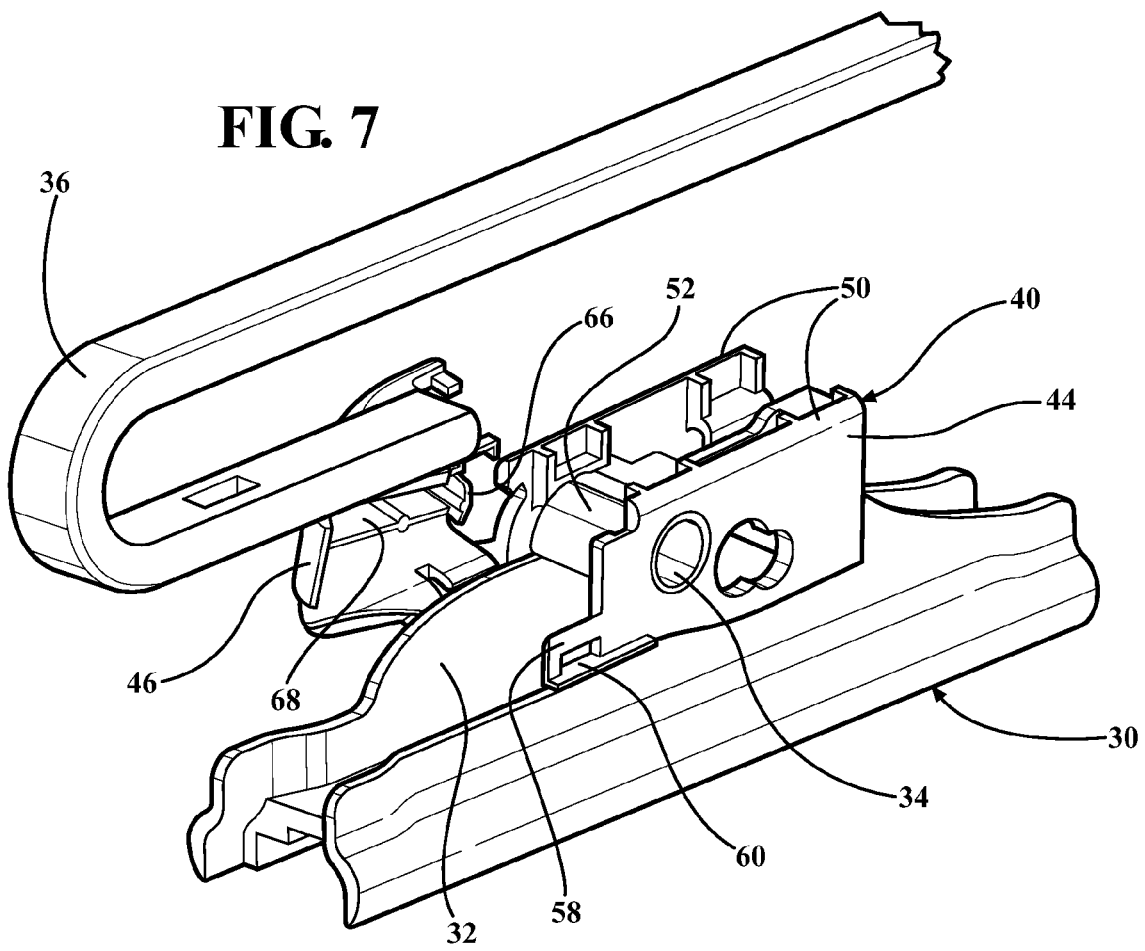
FIG. 7 is a perspective view of the first connecting device positioned adjacent a hook-style wiper arm.

As best shown in FIG. 6, the base side walls 32 are spaced from one another by a smaller distance than the main piece side walls 50. Accordingly, as shown in FIG. 6, when coupled with the base 30, the main piece 44 straddles the base side walls 32. To remove the main piece 44 from the base 30, the main piece side walls 50 are pulled or flexed outwardly to disengage the tubular portion 34 of the base 30 from the apertures 42 of the main piece 44.

The second connecting device 140 configured for receiving either a bayonet style wiper arm 38 or a top-lock style wiper arm (not shown) is generally shown in FIGS. 11-14 which sequentially show the second connecting device 140 being connected to the base 30 and then to a bayonet style wiper arm 38.

Obviously, many modifications and variations of the present invention are possible in light of the above teachings and may be practiced otherwise than as specifically described while within the scope of the appended claims.

What is claimed is:

1. A windscreen wiper device for cleaning a windshield of a vehicle, comprising:
a wiper strip extending in a longitudinal direction;
at least one carrier element in engagement with said wiper strip for operatively supporting and biasing said wiper strip into a predetermined configuration;
an at least two piece connecting device operatively coupled to said at least one carrier element and including a main piece with a bearing surface shaped for receiving and operatively supporting an end of a hook style wiper arm and a door piece pivotably coupled to said main piece and wherein said door piece is pivotable between an open position for allowing attachment and detachment between said connecting device and the wiper arm and a closed position for securing the wiper arm into engagement with said windscreen wiper device;
wherein said main piece is formed as a separate and distinct piece from that of the door piece, and wherein said main piece and said door piece include hinge portions that are arranged and mechanically interlock in such manner that said door piece is pivotably coupled to said main piece about an axis of said hinge portions that extends in said longitudinal direction;
wherein said door piece includes a tongue which projects from a top wall of said door piece;
said tongue presenting a retaining surface that is spaced a predetermined distance from and faces said bearing surface when said door piece is in said closed position for trapping a portion of the hook-shaped end of the wiper arm between said retaining surface and said bearing surface; and
wherein said door piece includes side walls that are laterally spaced from one another, and a further support wall that is arranged between and spaced from said side walls and that extends transversely to and directly engages and supports said tongue.

2. The windscreen wiper device as set forth in claim 1 wherein one of said main and door pieces includes a pin extending along said longitudinal axis and the other includes a generally claw shaped receiver engaging at least partially around said pin to establish said pivoting connecting between said door and main pieces.

3. The windscreen wiper device as set forth in claim 2 further including an enlarged piece at the end of said pin for restricting removal of said receiver from said pin.

4. The windscreen wiper device as set forth in claim 3 wherein said enlarged piece is also coupled with one of said side walls of said main piece.

5. The windscreen wiper device as set forth in claim 2 wherein main piece includes a pair of side walls and wherein said pin is integrally coupled to and extends forwardly away from one of said side walls and wherein said claw shaped receiver is disposed on said door piece.

6. The windscreen wiper device as set forth in claim 1 wherein said retaining surface on said door piece is on said tongue that extends generally downwardly when said door piece is in said closed position.

7. The windscreen wiper device as set forth in claim 1 wherein said bearing surface extends transversely between said side walls.

8. The windscreen wiper device as set forth in claim 7 wherein one of said side walls of said main piece includes a tab with a window and wherein said door piece includes a projection shaped to be received within said window to establish a locking relationship between said door piece and said main piece.

9. The windscreen wiper device as set forth in claim 8 wherein said main piece includes a pin disposed on said side wall opposite of said window and wherein said door piece includes a claw shaped receiver disposed opposite of said projection and engaged partially around said pin of said main piece to establish said pivoting relationship between said door piece and said main piece.

10. The windscreen wiper device as set forth in claim 1 further including a base permanently secured to said at least one carrier element and wherein said connecting device is removably coupled to said base.

11. The windscreen wiper device as set forth in claim 10 wherein said base includes a tubular portion and wherein said connecting device includes a pair of apertures receiving said tubular portion to establish a pivoting relationship between said base and said connecting device.

* * * * *